(12) United States Patent
Saito et al.

(10) Patent No.: US 11,781,620 B2
(45) Date of Patent: Oct. 10, 2023

(54) TRANSMISSION MECHANISM

(71) Applicant: SANKYO SEISAKUSHO CO., Tokyo (JP)

(72) Inventors: Takeshi Saito, Kikugawa (JP); Naoyuki Takahashi, Kikugawa (JP)

(73) Assignee: SANKYO SEISAKUSHO CO., Tokyo (JP)

( * ) Notice: Subject to any disclaimer, the term of this patent is extended or adjusted under 35 U.S.C. 154(b) by 0 days.

(21) Appl. No.: 17/799,188

(22) PCT Filed: Jan. 21, 2021

(86) PCT No.: PCT/JP2021/002007
§ 371 (c)(1),
(2) Date: Aug. 11, 2022

(87) PCT Pub. No.: WO2021/166539
PCT Pub. Date: Aug. 26, 2021

(65) Prior Publication Data
US 2023/0078045 A1    Mar. 16, 2023

(30) Foreign Application Priority Data
Feb. 19, 2020   (JP) .................. 2020-025827

(51) Int. Cl.
*F16H 1/32*    (2006.01)
*F16H 25/06*   (2006.01)
*F16H 49/00*   (2006.01)

(52) U.S. Cl.
CPC .............. *F16H 1/32* (2013.01); *F16H 25/06* (2013.01); *F16H 49/001* (2013.01)

(58) Field of Classification Search
CPC .......... F16H 1/32; F16H 25/06; F16H 49/001; F16H 2049/003; F16H 2025/066
(Continued)

(56) References Cited

U.S. PATENT DOCUMENTS

| 4,023,440 A | 5/1977 | Kennington et al. |
| 4,449,425 A * | 5/1984 | Carden ..................... F16H 1/32 |
| | | 475/180 |

(Continued)

FOREIGN PATENT DOCUMENTS

| JP | 2004-251374 A | 9/2004 |
| JP | 2009-281422 A | 12/2009 |
| JP | 2018-513332 A | 5/2018 |

OTHER PUBLICATIONS

International Search Report issued in PCT/JP2021/002007, dated Apr. 6, 2021; ISA/JP.

*Primary Examiner* — Sherry L Estremsky
(74) *Attorney, Agent, or Firm* — Harness, Dickey & Pierce, P.L.C.

(57) ABSTRACT

The present invention provides a transmission mechanism that enables a reduction in motion transmission error between an input-shaft side and an output-shaft side. A transmission mechanism is provided with a cam, a plurality of pins arranged along a side surface of the cam, guide plates in which a plurality of guide holes are provided, and gears capable of engaging the pins. In conjunction with rotation of the cam, each pin is guided by the corresponding guide hole and moves along the cam and the gears, thereby causing the guide plates or gears to rotate relative to the cam. The plurality of pins are divided into a plurality of groups, and the pins in each group are coupled in series, but are not coupled to the pins in the other groups.

10 Claims, 19 Drawing Sheets

(58) Field of Classification Search
USPC .......................................................... 475/167
See application file for complete search history.

(56) References Cited

U.S. PATENT DOCUMENTS

| | | | | |
|---|---|---|---|---|
| 4,552,037 A | * | 11/1985 | Distin, Jr. ................. | F16H 1/32 |
| | | | | 475/159 |
| 5,643,128 A | * | 7/1997 | Kennedy ................. | F16H 25/06 |
| | | | | 475/168 |
| 2018/0156314 A1 | | 6/2018 | Salisbury | |

* cited by examiner

TRANSMISSION MECHANISM

CROSS-REFERENCE TO RELATED APPLICATIONS

This application is a 371 U.S. National Phase of International Application No. PCT/JP2021/002007 filed on Jan. 21, 2021, which claims the benefit of priority from Japanese Patent Application No. 2020-025827 filed on Feb. 19, 2020. The entire disclosure of all of the above applications is incorporated herein by reference.

TECHNICAL FIELD

The present invention relates to a transmission mechanism capable of reducing a motion transmission error between an input shaft side and an output shaft side.

BACKGROUND ART

Patent Document 1 discloses a reduction mechanism including an elliptical cam, a roller link that contacts the outer periphery of the elliptical cam via rollers, a guide plate concentric with the elliptical cam, and an internal tooth plate. In the reduction mechanism, the elliptical cam is made an input shaft, the guide plate or the internal tooth plate is made an output shaft, guide holes arranged in a circle are provided in the guide plate, each guide hole corresponds to each pin for the rollers of the roller link, internal teeth are formed in a circle in the internal tooth plate, the number of the internal teeth is greater than the number of the pins of the roller link, the roller link is configured as a roller link chain in which link plates coupling the pins are arranged, and each pin of the roller link is guided via both each guide hole and the internal teeth in conjunction with rotation of the elliptical cam and advances into and retreats from the tooth groove of the internal tooth so as to rotate the guide plate or the internal tooth plate relative to each other.

Patent Document 2 discloses a reduction device including a first cam on the surface of which an annular groove is formed, a plurality of stepped pins arranged in the annular groove and freely rolling in the annular groove, a second cam in which a plurality of circular holes each of which individually regulates a motion of each stepped pin are provided, and a third cam having teeth that mesh with the stepped pins and converting a rotational motion of the first cam into a rotational motion of a predetermined reduction ratio.

CITATION LIST

Patent Literature

PATENT DOCUMENT 1: JP-A-2004-251374
PATENT DOCUMENT 2: JP-A-2009-281422

SUMMARY OF INVENTION

Technical Problem

The reduction mechanism of Patent Document 1 has a structure in which the roller link contacts the outer periphery of the elliptical cam via the rollers, and all of the pins for the rollers are coupled by the link plate. In the reduction mechanism of Patent Document 1, there is a problem that a polygonal motion of the link plate between the minor axis portion and the major axis portion of the elliptical cam causes speed differences between the pins, and these speed differences interfere with each other so as to cause a motion transmission error between the input shaft side and the output shaft side. The reduction device of Patent Document 2 has a structure in which the stepped pins are arranged so as to be surrounded by the annular groove. In the reduction device of Patent Document 2, there is a problem that the wear of the stepped pins is facilitated due to contact with the annular groove, and a long life cannot be expected.

Therefore, an object of the present invention is to provide a transmission mechanism capable of solving the above problems and reducing the motion transmission error between the input shaft side and the output shaft side.

Solution to Problem

According to an aspect of the present invention, a transmission mechanism includes a first shaft rotatable about a first rotational axis, the first shaft including a cam concentric with the first shaft and fixed to the first shaft, the side surface of the cam having a positive curvature when viewed from the first rotational axis, a plurality of pins arranged along the side surface of the cam, a second shaft rotatable about a second rotational axis, a guide plate concentric with the second shaft, in the guide plate a plurality of guide holes being provided along a rotational direction of the second shaft, each pin being accommodated in a corresponding guide hole, and a gear concentric with the second shaft, the gear being capable of engaging with each pin. In conjunction with rotation of one of the first shaft and the second shaft, each pin is guided by the corresponding guide hole so as to move along the cam and the gear, thereby causing the other of the first shaft and the second shaft to rotate relative to the one of the first shaft and the second shaft. The plurality of pins are divided into a plurality of groups, and whereas the pins in one group are coupled in series, the pins in the one group are not coupled to the pins in another group.

According to a specific example of the present invention, in the transmission mechanism, the curvature of the side surface of the cam obtained by circling along a rotational direction of the first shaft has two local maximal values or more, and the plurality of pins are divided into a plurality of groups based on the number of the local maximal values.

According to a specific example of the present invention, in the transmission mechanism, the plurality of pins are divided into a plurality of groups by an integral multiple greater than or equal to 2 of the number of the local maximal values.

According to a specific example of the present invention, in the transmission mechanism, the plurality of pins are divided into a plurality of groups by an integer greater than or equal to 2.

According to a specific example of the present invention, in the transmission mechanism, the pins in the one group are coupled in series such that two adjacent pins are coupled by a chain.

According to a specific example of the present invention, in the transmission mechanism, either one of the guide plate and the gear is fixed to the second shaft.

According to a specific example of the present invention, in the transmission mechanism, the gear is an internal gear, and the plurality of pins are arranged outside the cam.

According to a specific example of the present invention, in the transmission mechanism, when the gear is the internal gear, the number of teeth of the gear is the sum of the number of the plurality of pins and the number of the local maximal values.

According to a specific example of the present invention, in the transmission mechanism, the gear is an external gear, and the plurality of pins are arranged inside the cam.

According to a specific example of the present invention, in the transmission mechanism, when the gear is the external gear, the number of the plurality of pins is the sum of the number of teeth of the gear and the number of the local maximal values.

Advantageous Effect of Invention

According to the present invention, by dividing the plurality of pins arranged along the side surface of the cam into a plurality of groups and coupling the pins in series only in each group, it is possible to restrict the influence of the speed difference between the pins only to each group, and it is possible to reduce the motion transmission error between the input shaft side and the output shaft side due to the entire plurality of pins.

Other objects, features and advantages of the present invention will become apparent from the following description of the embodiments of the present invention taken in conjunction with the accompanying drawings.

DESCRIPTION OF EMBODIMENTS

Figure 1A:
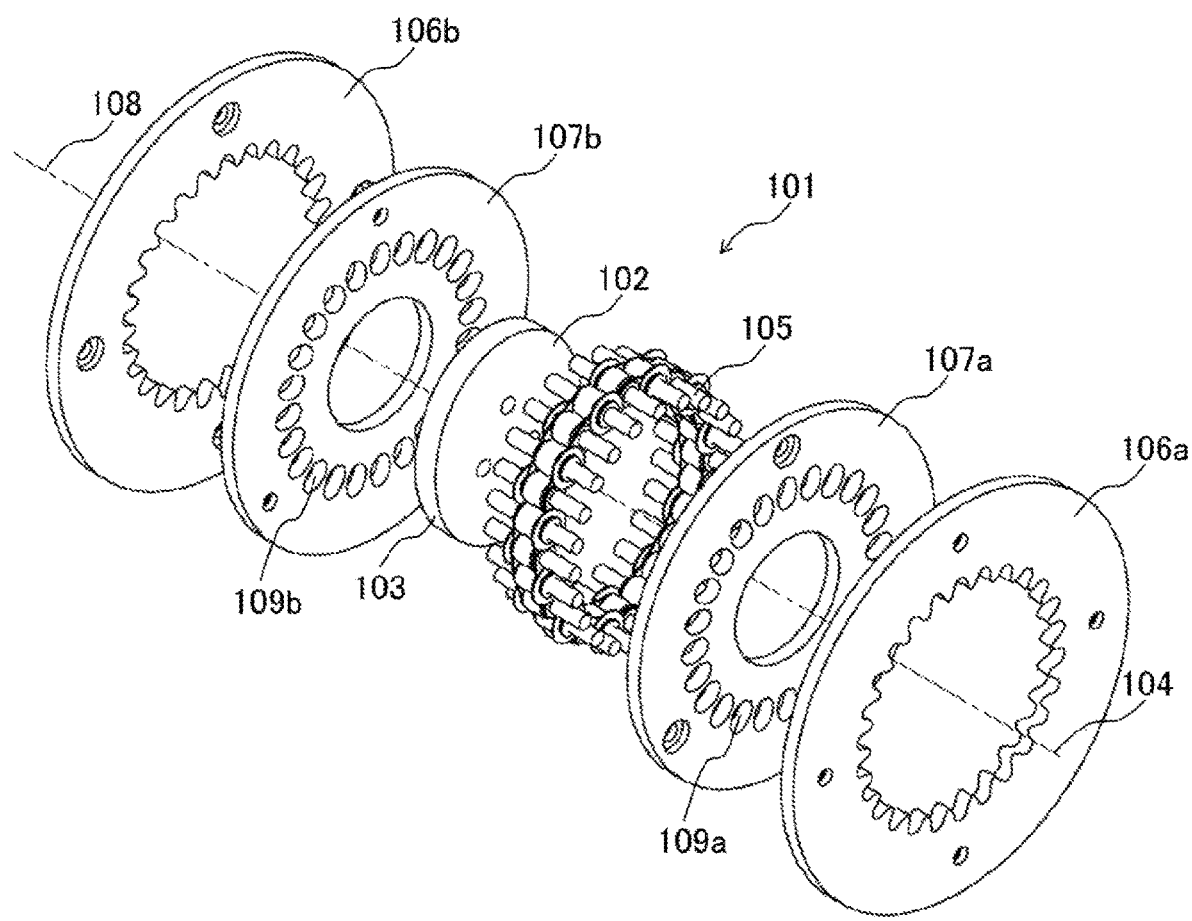
FIG. 1A is an exploded perspective view of a transmission mechanism as one embodiment of the present invention.
Figure 1B:
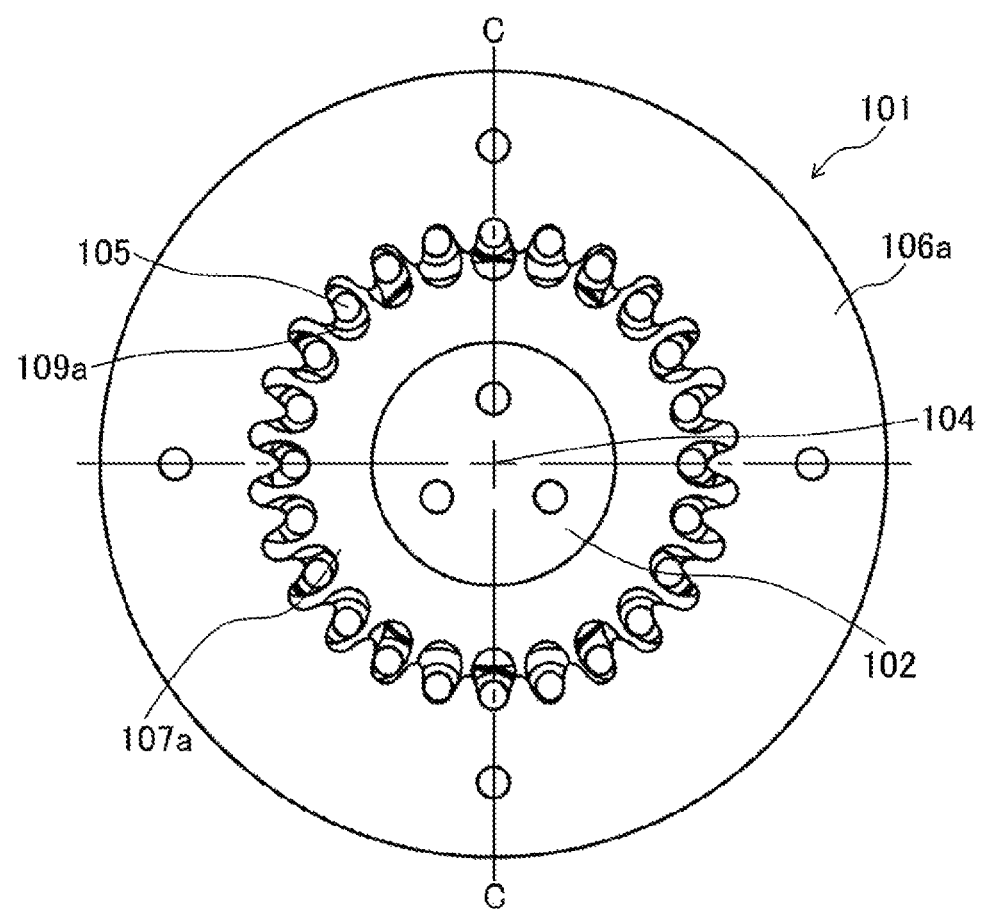
FIG. 1B is a top view of the transmission mechanism of FIG. 1A.
Figure 1C:
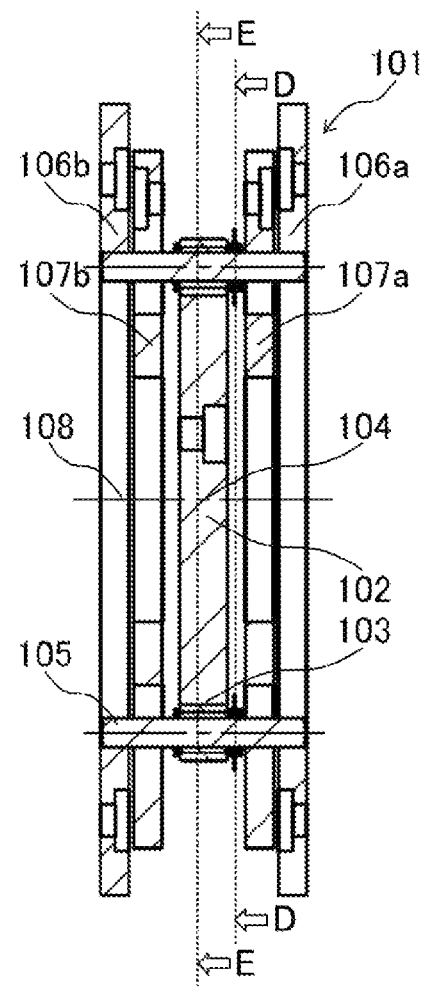
FIG. 1C is a cross-sectional view taken along the line C-C of FIG. 1B of the transmission mechanism of FIG. 1A.
Figure 1D:
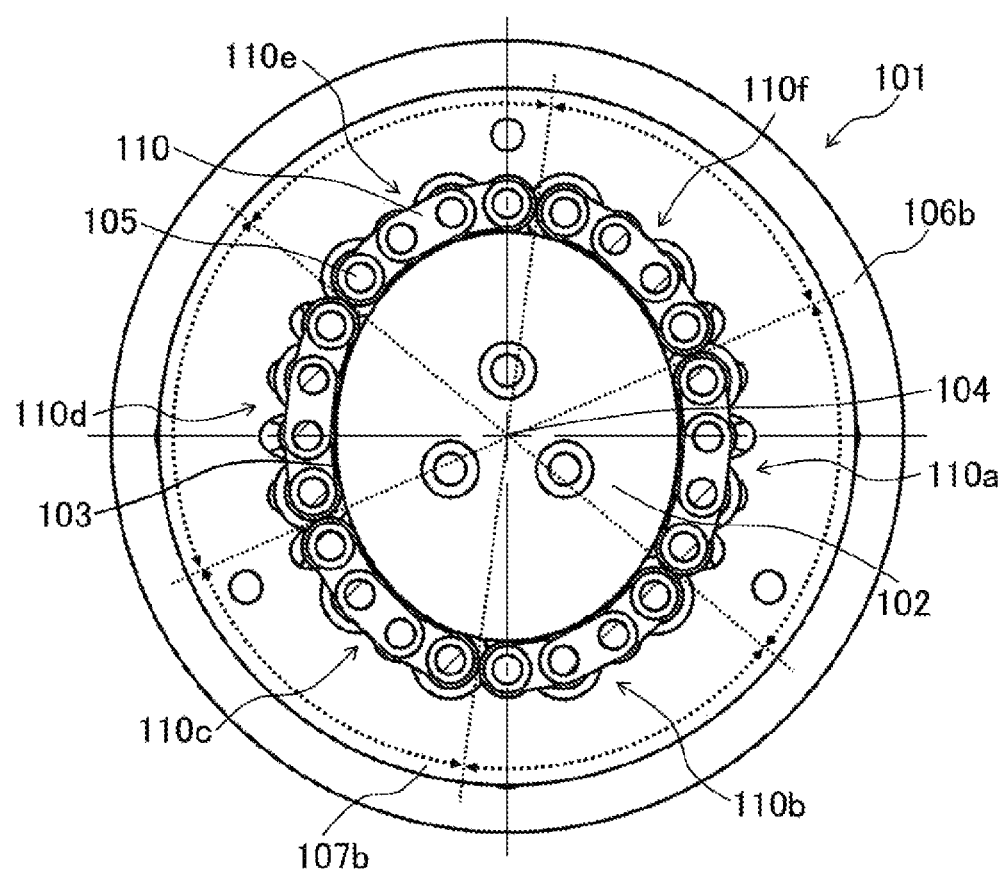
FIG. 1D is a cross-sectional view taken along the line D-D of FIG. 1C of the transmission mechanism of FIG. 1A.
Figure 1E:
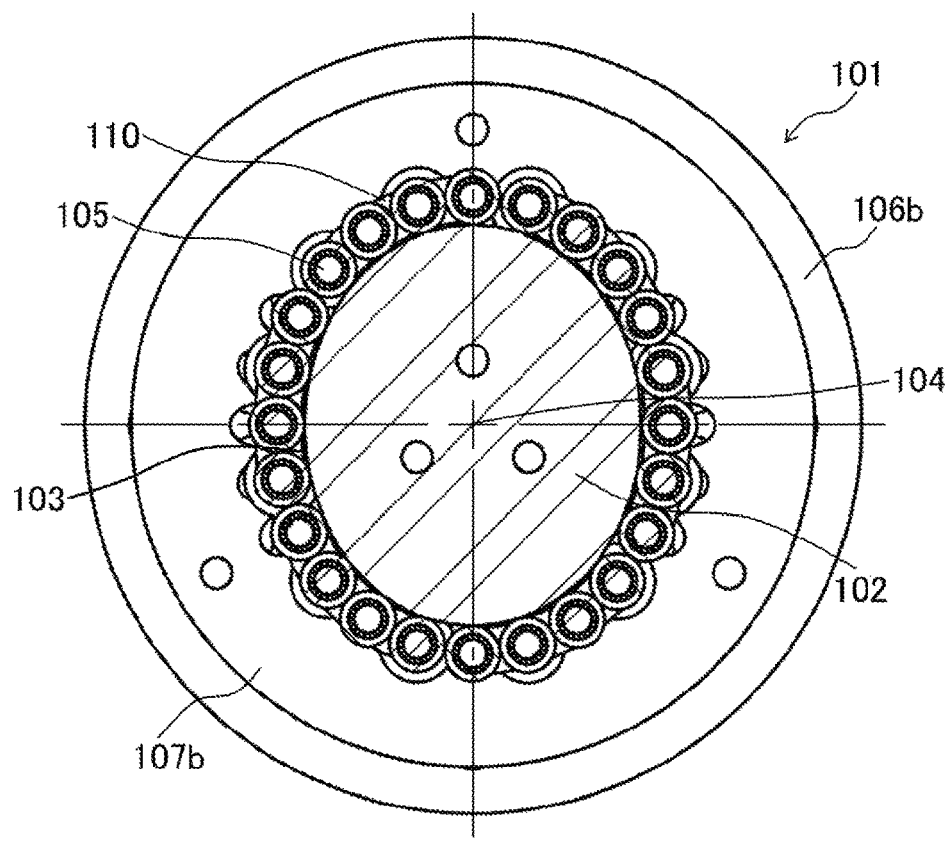
FIG. 1E is a cross-sectional view taken along the line E-E of FIG. 1C of the transmission mechanism of FIG. 1A.
Figure 1F:
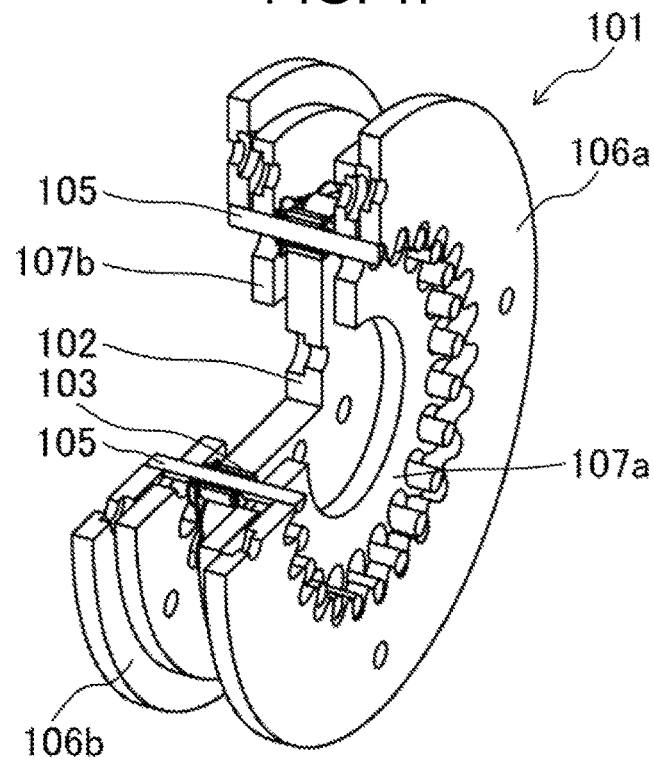
FIG. 1F is a perspective view which shows a partial cross section of the transmission mechanism of FIG. 1A.
Figure 2A:
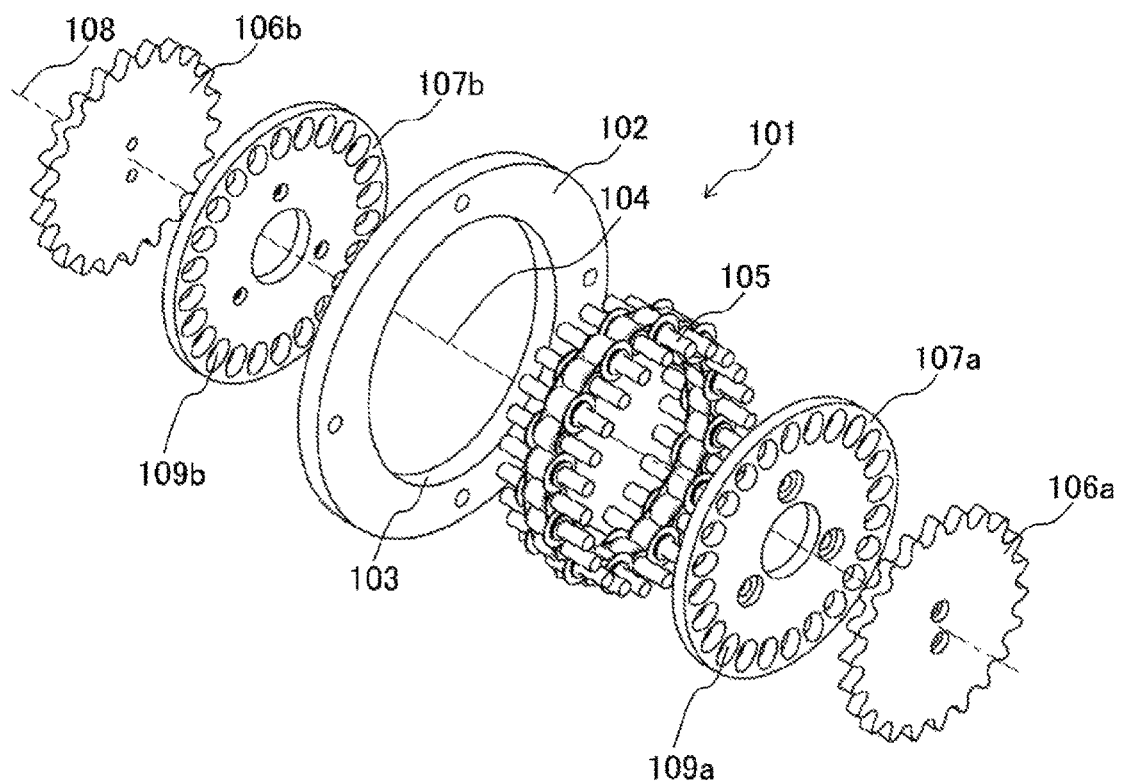
FIG. 2A is an exploded perspective view of a transmission mechanism as another embodiment of the present invention.
Figure 2B:
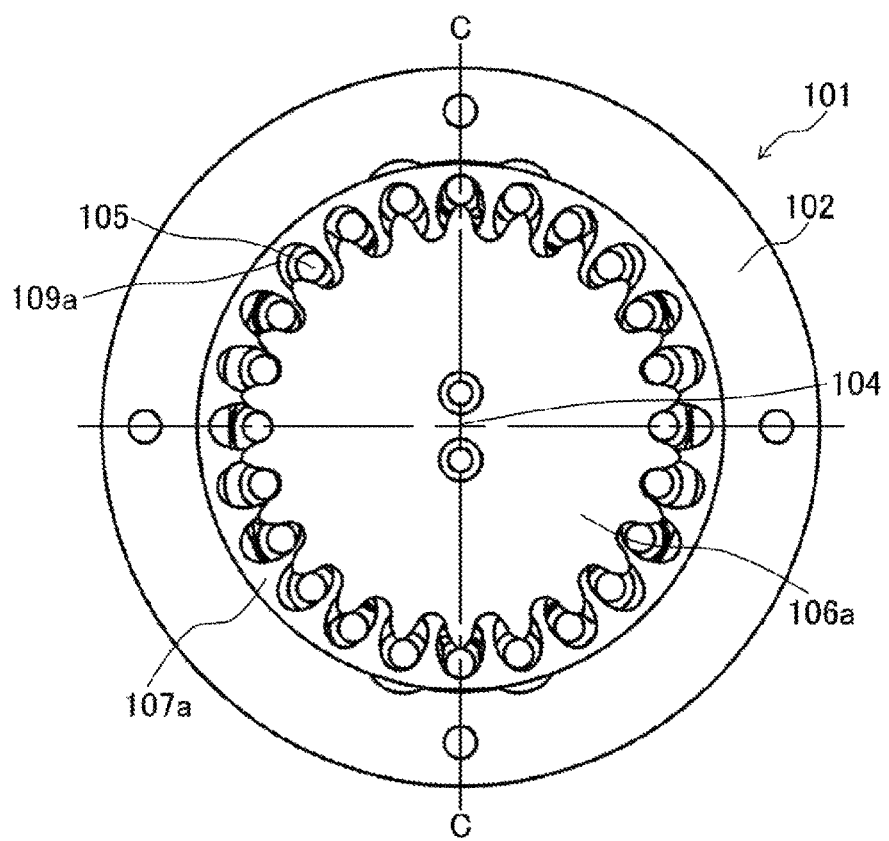
FIG. 2B is a top view of the transmission mechanism of FIG. 2A.
Figure 2C:
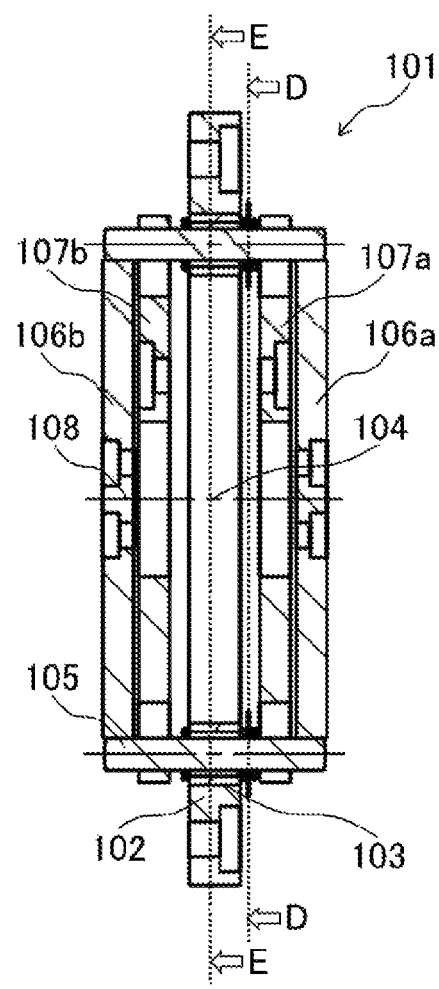
FIG. 2C is a cross-sectional view taken along the line C-C of FIG. 2B of the transmission mechanism of FIG. 2A.
Figure 2D:
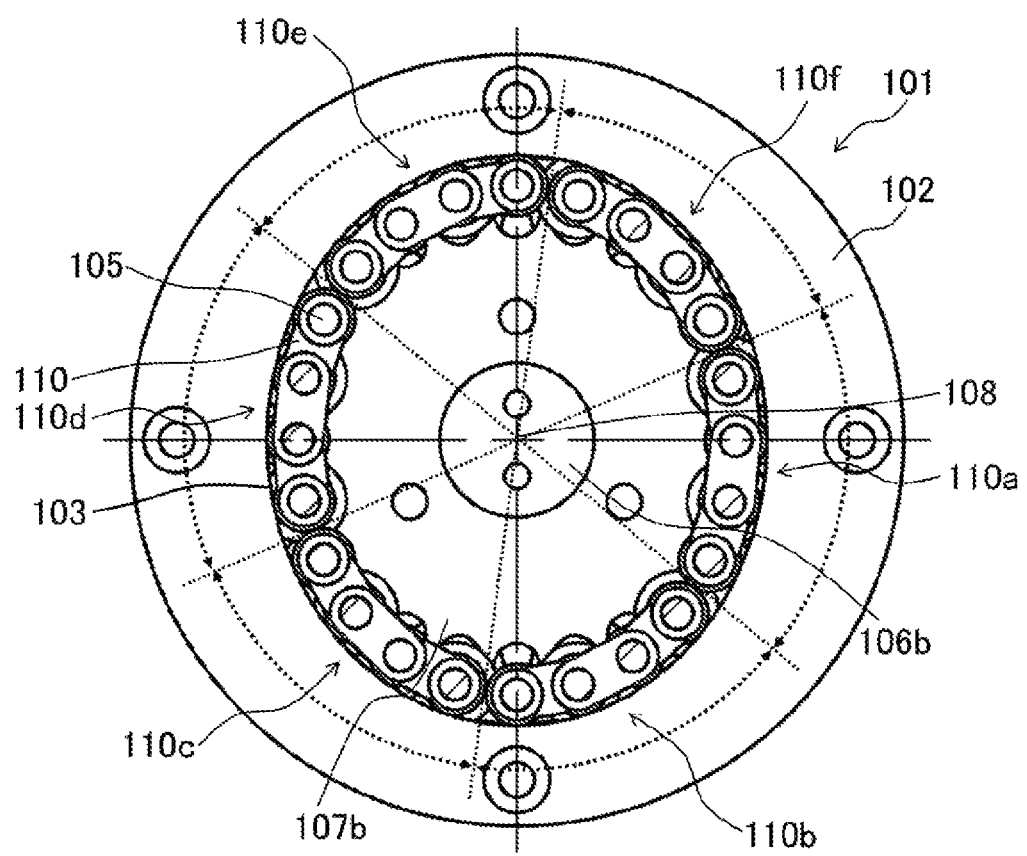
FIG. 2D is a cross-sectional view taken along the line D-D of FIG. 2C of the transmission mechanism of FIG. 2A.
Figure 2E:
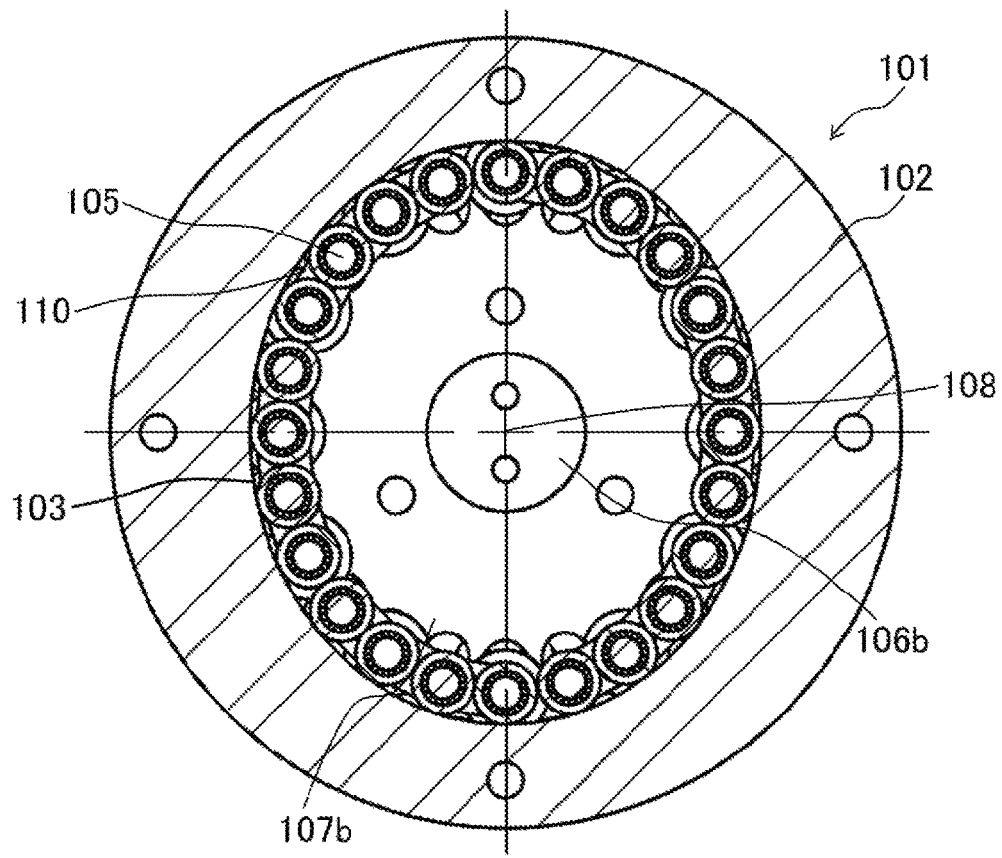
FIG. 2E is a cross-sectional view taken along the line E-E of FIG. 2C of the transmission mechanism of FIG. 2A.
Figure 2F:
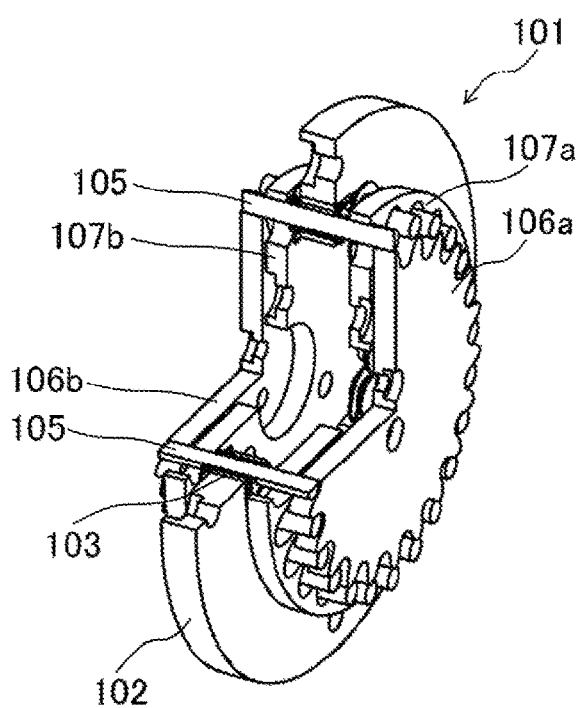
FIG. 2F is a perspective view which shows a partial cross section of the transmission mechanism of FIG. 2A.
Figure 3A:
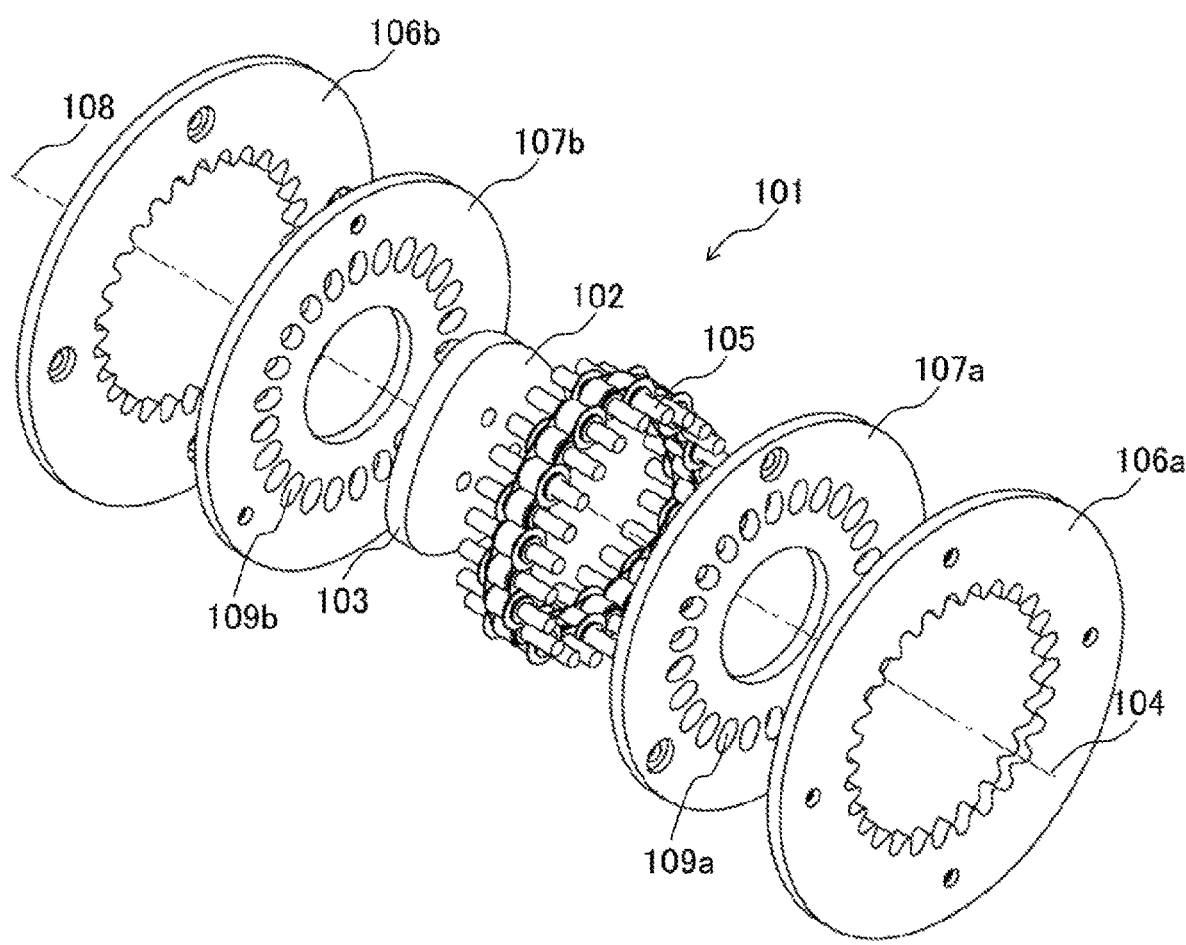
FIG. 3A is an exploded perspective view of a transmission mechanism as another embodiment of the present invention.
Figure 3B:
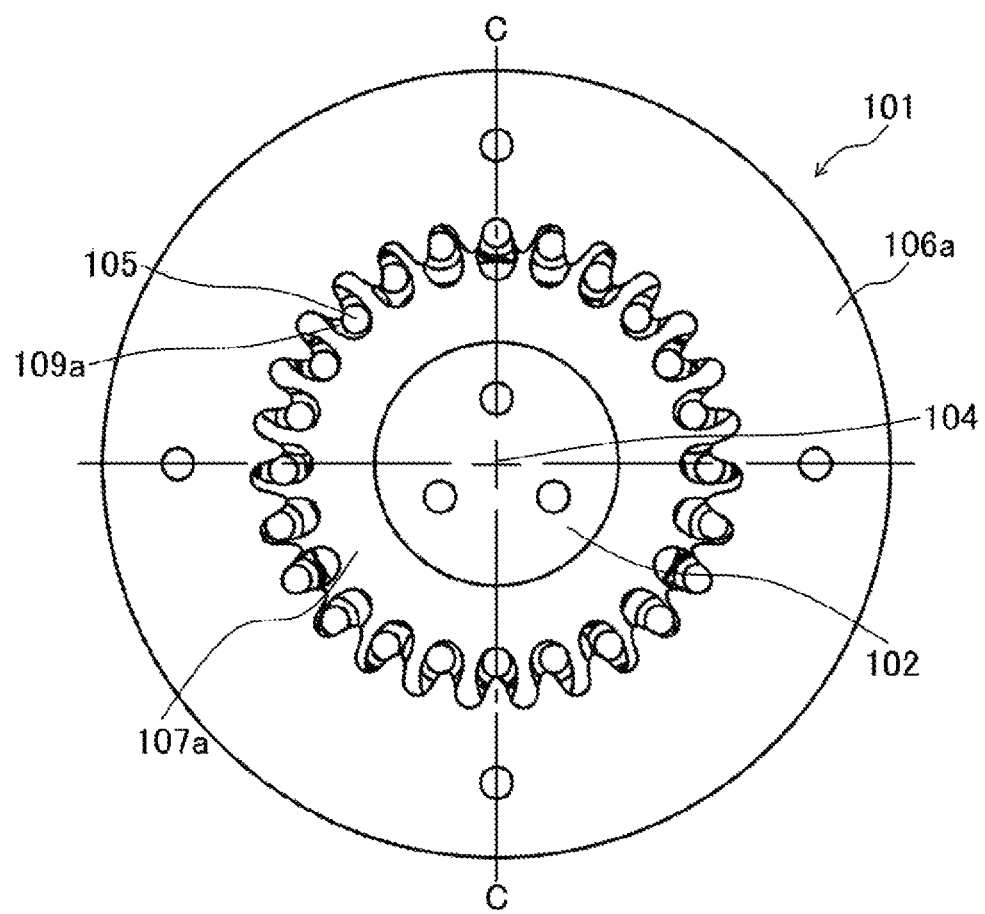
FIG. 3B is a top view of the transmission mechanism of FIG. 3A.
Figure 3C:
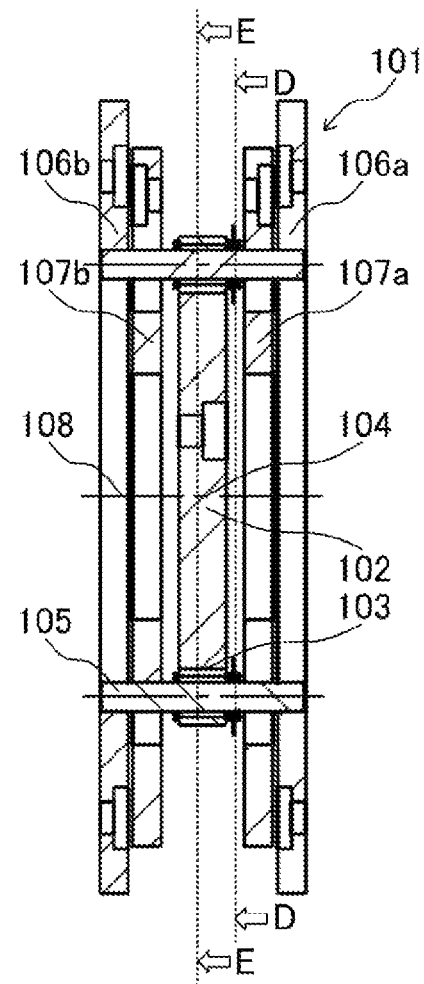
FIG. 3C is a cross-sectional view taken along the line C-C of FIG. 3B of the transmission mechanism of FIG. 3A.
Figure 3D:
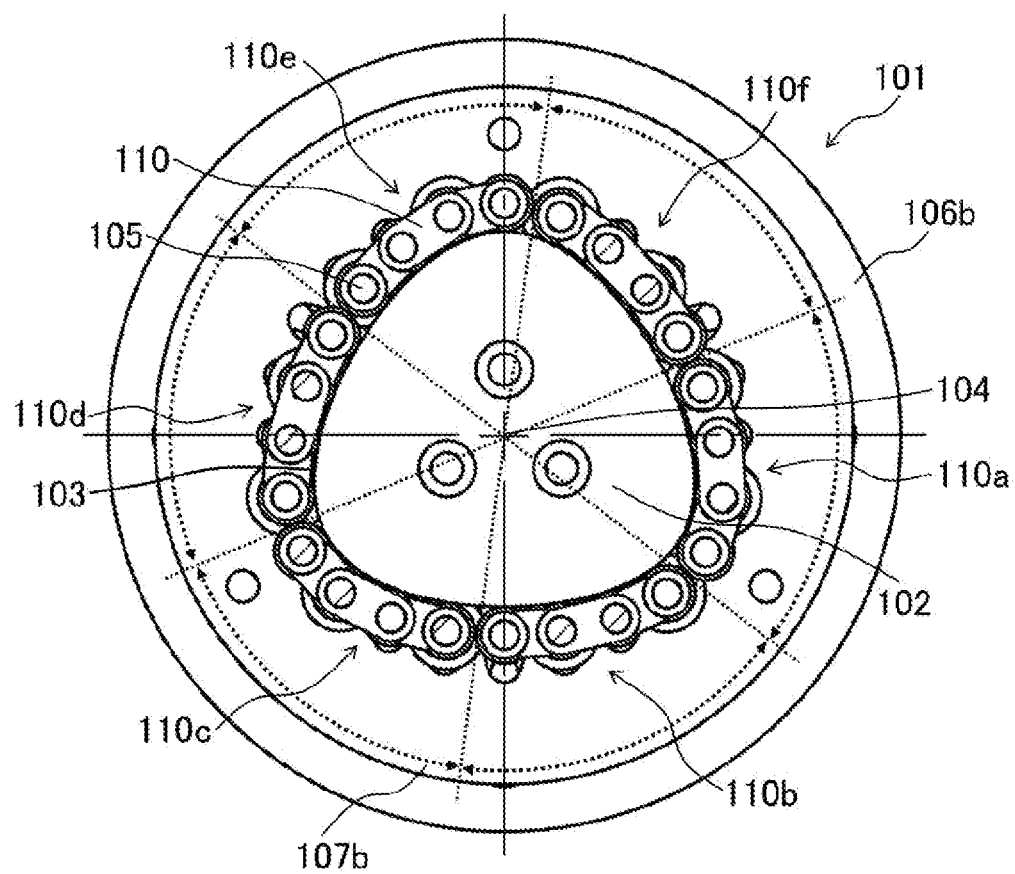
FIG. 3D is a cross-sectional view taken along the line D-D of FIG. 3C of the transmission mechanism of FIG. 3A.
Figure 3E:
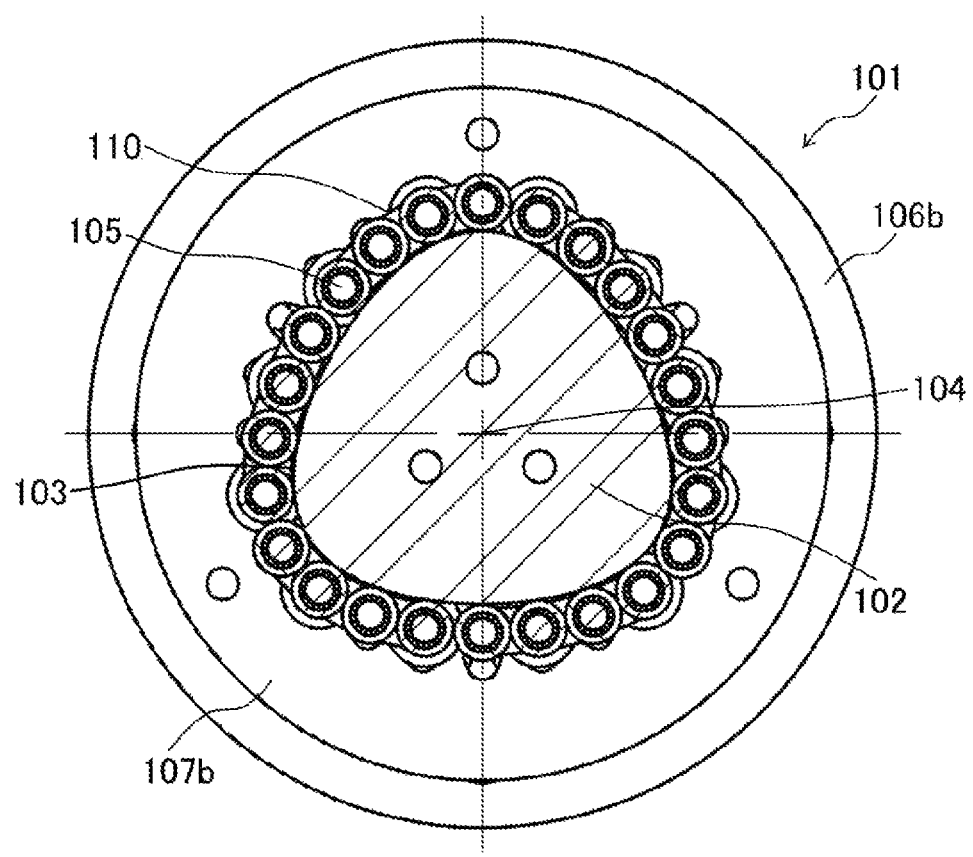
FIG. 3E is a cross-sectional view taken along the line E-E of FIG. 3C of the transmission mechanism of FIG. 3A.
Figure 4A:
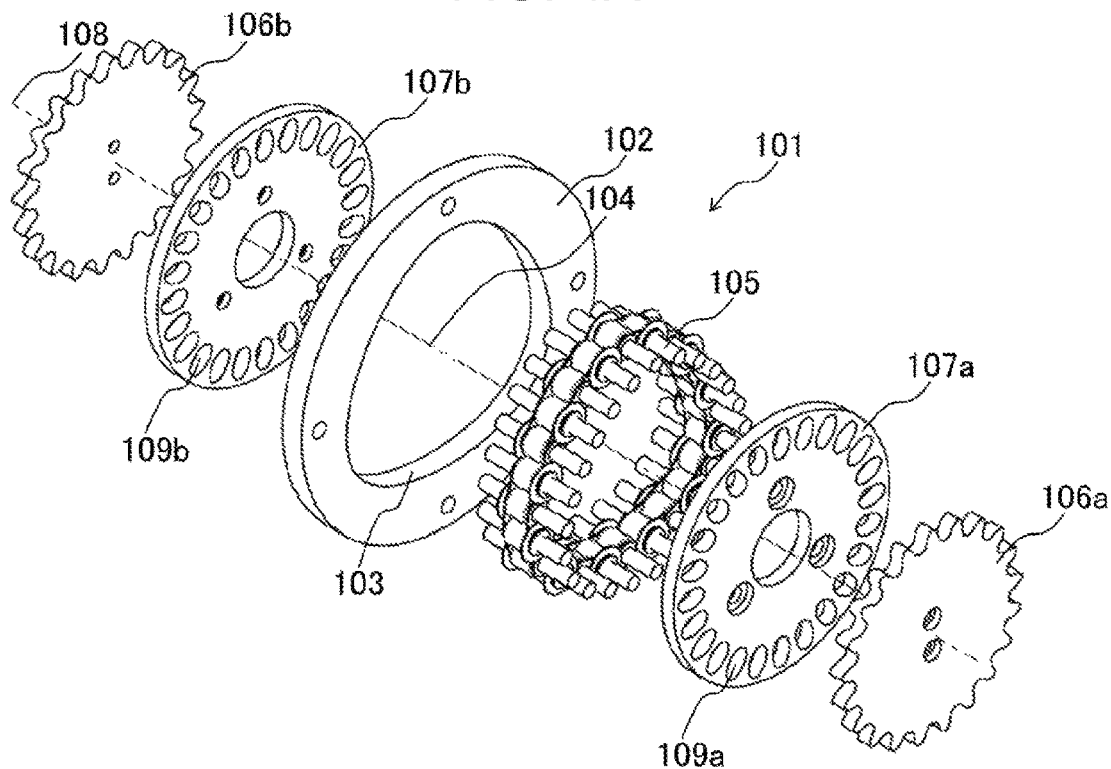
FIG. 4A is an exploded perspective view of a transmission mechanism as another embodiment of the present invention.
Figure 4B:
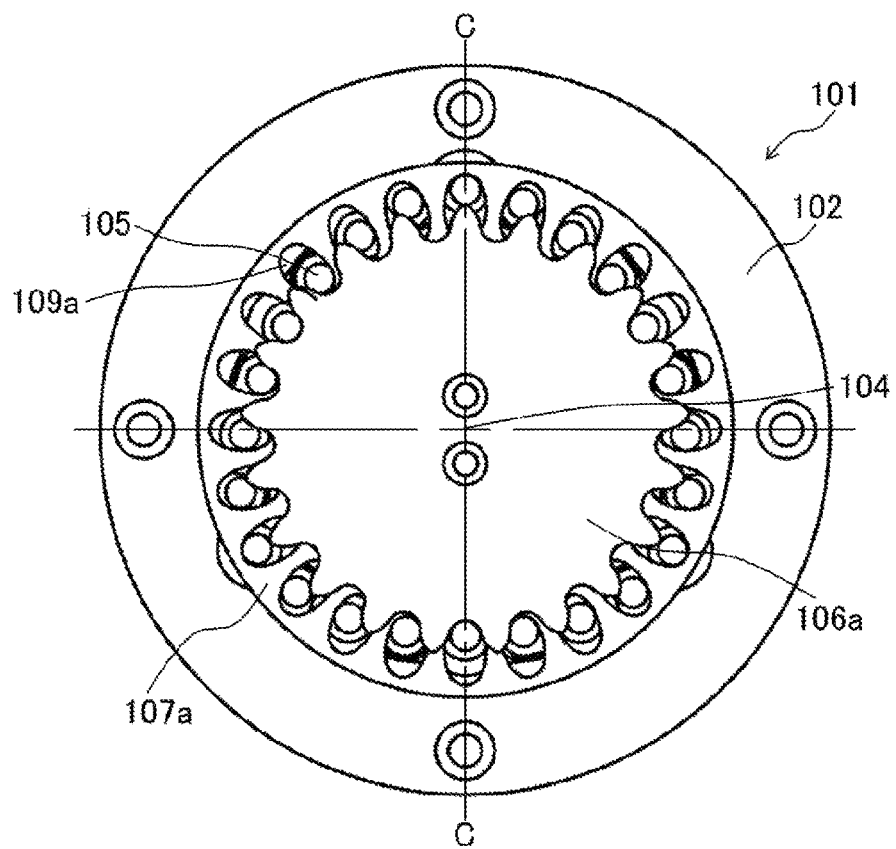
FIG. 4B is a top view of the transmission mechanism of FIG. 4A.
Figure 4C:
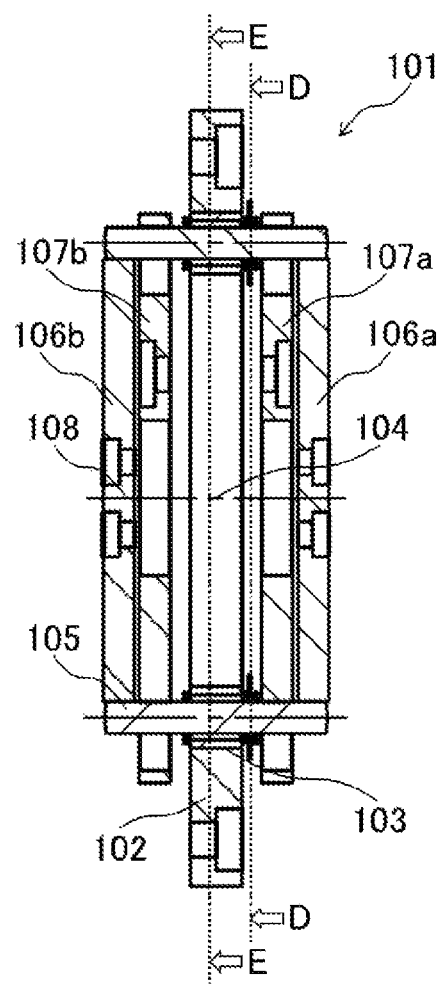
FIG. 4C is a cross-sectional view taken along the line C-C of FIG. 4B of the transmission mechanism of FIG. 4A.
Figure 4D:
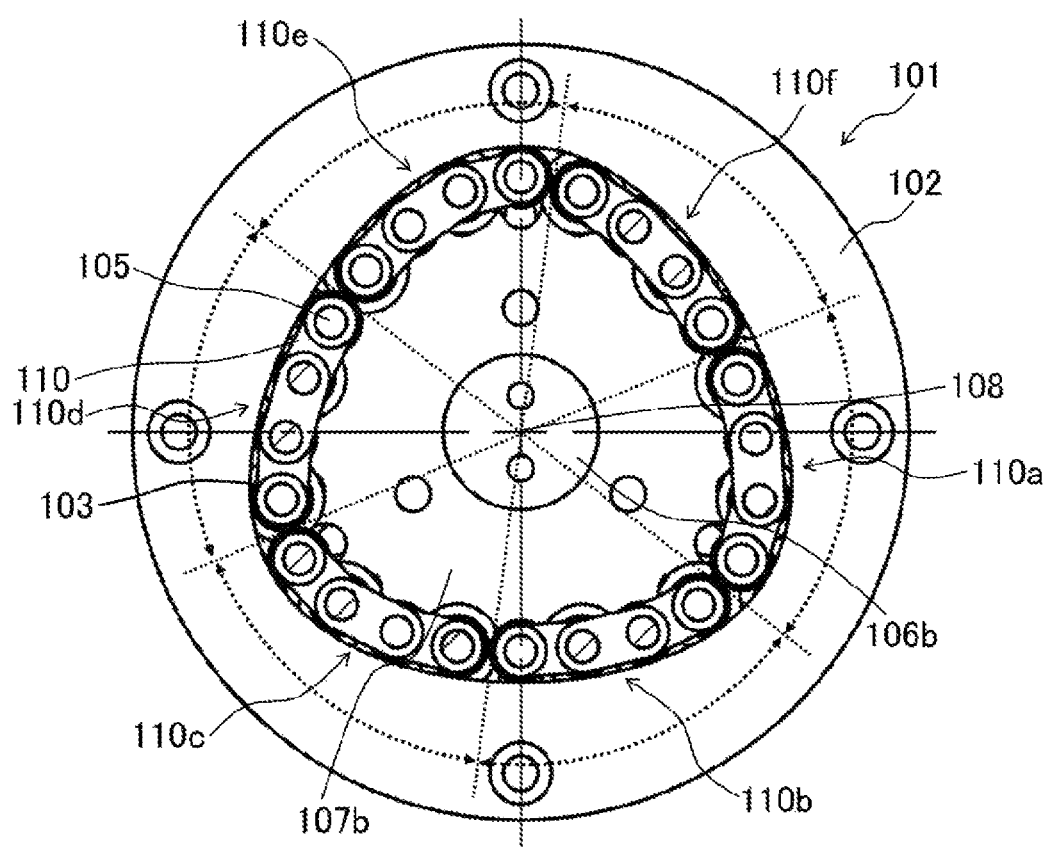
FIG. 4D is a cross-sectional view taken along the line D-D of FIG. 4C of the transmission mechanism of FIG. 4A.
Figure 4E:
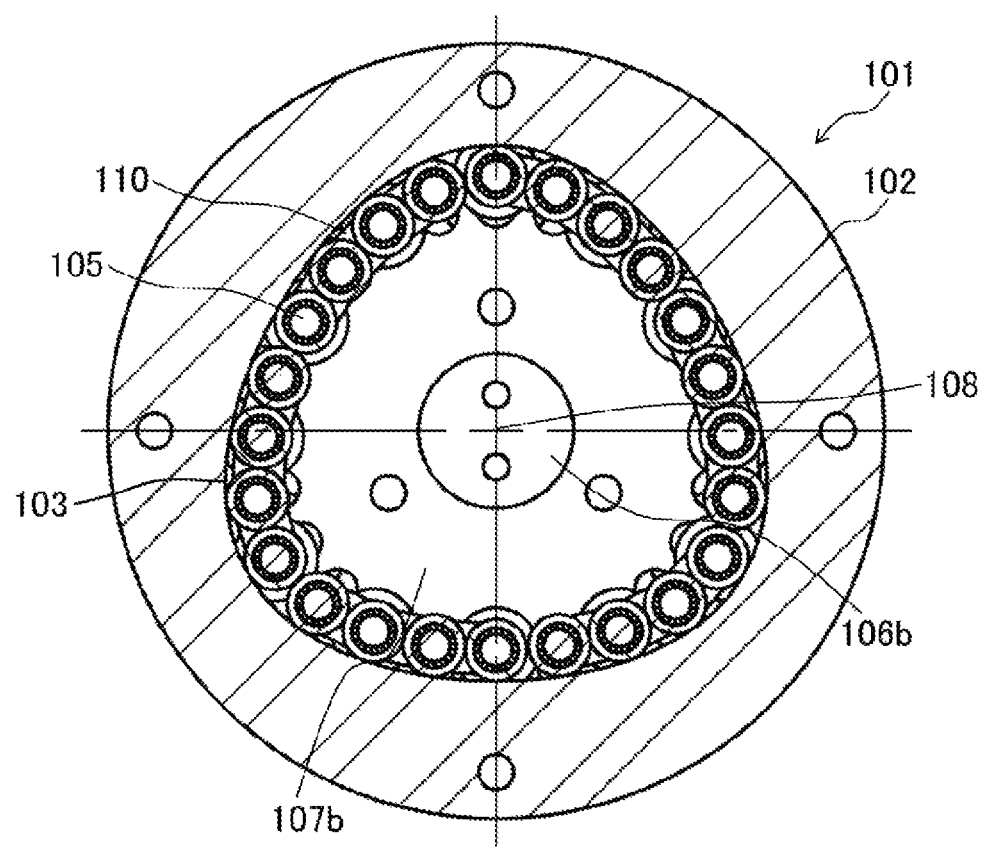
FIG. 4E is a cross-sectional view taken along the line E-E of FIG. 4C of the transmission mechanism of FIG. 4A.

Embodiments according to the present invention will be described with reference to the drawings. However, the present invention is not limited to those embodiments.

Various embodiments of a transmission mechanism 101 will be described with reference to FIGS. 1A to 5C. The transmission mechanism 101 includes a first shaft (not shown) rotatable about a first rotational axis 104, and a second shaft (not shown) rotatable about a second rotational axis 108. The first rotational axis 104 and the second rotational axis 108 may be on the same line. The first shaft may be an input shaft and the second shaft may be an output shaft. Instead, the second shaft may be an input shaft and the first shaft may be an output shaft. The first shaft includes a cam 102 concentric with the first shaft and fixed to the first shaft. The transmission mechanism 101 further includes a plurality of pins 105 arranged along the side surface 103 of the cam 102, a guide plate concentric with the second shaft, in the guide plate a plurality of guide holes being provided along a rotational direction of the second shaft, and a gear concentric with the second shaft, the gear being capable of engaging with each pin 105. Each pin 105 is accommodated in any of the corresponding guide holes of the plurality of guide holes provided in the guide plate.

The side surface 103 of the cam 102 has a positive curvature when viewed from the first rotational axis 104. That is to say, in a cross section of the side surface 103 of the cam 102 in a plane perpendicular to the first rotational axis 104, when a case where the normal vector of the side surface 103 of the cam 102 points in the direction of the first rotational axis 104 is assumed to be a positive curvature, the curvature of the side surface 103 of the cam 102 is always positive in the cross section. As shown in FIGS. 1A to 1F and 3A to 3E, when the gear that can engage with each pin 105 is an internal gear, the cam 102 may have the side surface 103 by a column body having a convex side surface when viewed from the first rotational axis 104. As shown in FIGS. 2A to 2F and 4A to 4E, when the gear that can engage with each pin 105 is an external gear, the cam 102 may have the side surface 103 by a through hole of a column body having a convex side surface when viewed from the first rotational axis 104. For example, the side surface 103 of the cam 102 may have a shape of the side surface of an elliptical cylinder, or a shape of the side surface of a substantially regular polygonal cylinder such as a substantially regular triangular cylinder, a substantially regular square cylinder, a substantially regular pentagonal cylinder, or the like, about the first rotational axis 104.

In conjunction with rotation of one of the first shaft and the second shaft, each pin 105 is guided by the corresponding guide hole so as to move along the cam 102 and the gear, thereby causing the other of the first shaft and the second shaft to rotate relative to the one of the first shaft and the second shaft. For example, as the first shaft or the second shaft as the input shaft rotates, each pin 105 is guided by the guide hole in which the pin 105 is accommodated so as to move along the cam 102 and the gear. The motion of each pin 105 causes the second shaft or the first shaft as the output shaft to rotate relative to the first shaft or the second shaft as the input shaft. In addition, each guide hole is formed in a shape that causes each pin 105 to move by a predetermined amount in the corresponding guide hole when the first shaft or the second shaft as the input shaft rotates. For example, each guide hole may be formed in a substantially elliptical shape of which a major axis points in the direction of the second rotational axis 108.

The gear may be arranged on one side with respect to the cam 102. Moreover, as shown in FIGS. 1A to 4E, the gear may be a pair of gears configured from a first gear 106*a* which is concentric with the second shaft and has a plurality of teeth along the rotational direction of the second shaft, and a second gear 106*b* which is concentric with the second shaft and has a plurality of teeth along the rotational direction of the second shaft. The first gear 106*a* and the second gear 106*b* are arranged so as to sandwich the cam 102 between them. Moreover, the first gear 106*a* and the second gear 106*b* are arranged such that positions of the teeth of the first gear 106*a* and positions of the teeth of the second gear 106*b* are approximately aligned with each other so as to approximately match phases of the two teeth when the transmission mechanism 101 is viewed from the top surface. In addition, although it is assumed in the following description that the gear is a pair of gears configured from the first gear 106*a* and the second gear 106*b*, the same applies when the gear is arranged on one side with respect to the cam 102.

The guide plate may be arranged on one side with respect to the cam 102. Moreover, as shown in FIGS. 1A to 4E, the guide plate may be a pair of guide plates configured from a first guide plate 107*a* which is concentric with the second shaft, and a second guide plate 107*b* which is concentric with the second shaft. The first guide plate 107*a* and the second guide plate 107*b* are arranged so as to sandwich the cam 102. In addition, the first guide plate 107*a* and the second guide plate 107*b* may be arranged so as to sandwich the first gear 106*a* and the second gear 106*b*, and the first gear 106*a* and the second gear 106*b* may be arranged so as to sandwich the first guide plate 107*a* and the second guide plate 107*b*. A plurality of first guide holes 109*a* are provided in the first guide plate 107*a* along the rotational direction of the second shaft, and a plurality of second guide holes 109*b* are provided in the second guide plate 107*b* along the rotational direction of the second shaft. Each pin 105 is accommodated in the corresponding first guide hole 109*a* of the first guide plate 107*a* and the corresponding second guide hole 109*b* of the second guide plate 107*b*, and is guided by the corresponding first guide hole 109*a* and the corresponding second guide hole 109*b* so as to move along the cam 102, the first gear 106*a*, and the second gear 106*b*. In addition, although it is assumed in the following description that the guide plate is a pair of guide plates configured from the first guide plate 107*a* and the second guide plate 107*b*, the same applies when the guide plate is arranged on one side with respect to the cam 102.

The plurality of pins 105 are divided into a plurality of groups. For example, as shown in FIGS. 1D, 2D, 3D, and 4D, the plurality of pins 105 may be divided into a first group 110*a* to a sixth group 110*f*. Whereas the pins 105 in each of the first group 110*a* to the sixth group 110*f* are coupled in series to the pins 105 of a group to which the pins 105 belong (for example, the first group 110*a*), they are not coupled to the pins 105 of a group to which the pins 105 do not belong (for example, the second group 110*b* to the sixth group 110*f*). In this way, by dividing the plurality of pins 105 arranged along the side surface 103 of the cam 102 into the first group 110*a* to the sixth group 110*f*, and coupling only the pins 105 in each of the first group 110*a* to the sixth group 110*f* in series, it is possible to restrict the influence of the speed difference between the pins 105 only to each of the first group 110*a* to the sixth group 110*f* to which the pins 105 belong, whereby it is possible to reduce the motion transmission error between the first shaft and the second shaft due to the entire plurality of pins 105.

The curvature of the side surface 103 of the cam 102 obtained by circling along a rotational direction of the first shaft from 0 to 360° may have two local maximal values or more. Moreover, the two local maximal values or more of the curvature may be obtained at equal intervals from 0 to 360°. For example, as shown in FIGS. 1A to 2F, when the cam 102 has a shape having the side surface 103 of an elliptical cylinder, there is a local maximal value of the curvature at each of two vertices of the major axis of ellipse at 180° intervals in the cross section of the cam 102 in a plane perpendicular to the first rotational axis 104. As shown in FIGS. 3A to 4E, when the cam 102 has a shape having the side surface 103 of a substantially regular triangular cylinder, there is a local maximal value of the curvature at each of three vertices of a substantially regular triangle at 120° intervals in the cross section of the cam 102 in a plane perpendicular to the first rotational axis 104. Then, the plurality of pins 105 may be divided into a plurality of groups based on the number of the local maximal values. As one of the first shaft and the second shaft rotates, the teeth of the first gear 106*a* and the second gear 106*b* with which each pin 105 engages are altered, according to the relationship between the side surface 103 of the cam 102 having such local maximal values and the first gear 106*a* and the second gear 106*b*, whereby the rotation of the one is transmitted to the other of the first shaft and the second shaft so as to rotate the other. By dividing the plurality of pins 105 into the plurality of groups based on the number of the local maximal values, even if the speed difference is generated between the pins 105 between a side surface portion of the local maximal value and a side surface portion of the local minimal value of the side surface 103 of the cam 102, it is possible to restrict the mutual interference between the pins 105 due to this speed difference only to each of the first group 110*a* to the sixth group 110*f* to which the pins 105 belong, whereby it is possible to reduce the motion transmission error between the first shaft and the second shaft due to the entire plurality of pins 105.

The plurality of pins 105 may be divided into a plurality of groups by an integral multiple greater than or equal to 2 of the number of the local maximal values of the curvature of the side surface 103 of the cam 102. Moreover, the plurality of pins 105 may be divided into a plurality of groups by an even number. For example, as shown in FIGS. 1A to 2F, when the cam 102 has a shape having the side surface 103 of an elliptical cylinder, since there is a local maximal value of the curvature at each of two vertices of the major axis of ellipse at 180° intervals in the cross section of the cam 102 in a plane perpendicular to the first rotational axis 104, the plurality of pins 105 may be divided into six groups of the first group 110*a* to the sixth group 110*f*, by six being three times two which is the number of the local maximal values and being also an even number. Moreover, as shown in FIGS. 3A to 4E, when the cam 102 has a shape having the side surface 103 of a substantially regular triangular cylinder, since there is a local maximal value of the curvature at each of three vertices of a substantially regular triangle at 120° intervals in the cross section of the cam 102 in a plane perpendicular to the first rotational axis 104, the plurality of pins 105 may be divided into six groups of the first group 110a to the sixth group 110f, by six being two times three which is the number of the local maximal values and being also an integer greater than or equal to 2.

The pins 105 in each of the first group 110a to the sixth group 110f may be coupled in series such that two adjacent pins 105 are coupled by a chain 110. For example, as shown in FIGS. 1D, 2D, 3D, and 4D, in each of the first group 110a to the sixth group 110f, each pin 105 and its adjacent pin 105 are coupled by the chain 110 so as to be rotatable relative to each other, whereby it is possible to move the pins 105 in each of the first group 110a to the sixth group 110f in conjunction with each other along the cam 102 and the gear. On the other hand, since the pins 105 in each of the first group 110a to the sixth group 110f are not coupled to the pins 105 in a group to which the pins 105 do not belong, it is possible to restrict the influence of the speed difference between the pins 105 only to each of the first group 110a to the sixth group 110f to which the pins 105 belong, whereby it is possible to reduce the motion transmission error between the first shaft and the second shaft due to the entire plurality of pins 105.

Figure 5A:
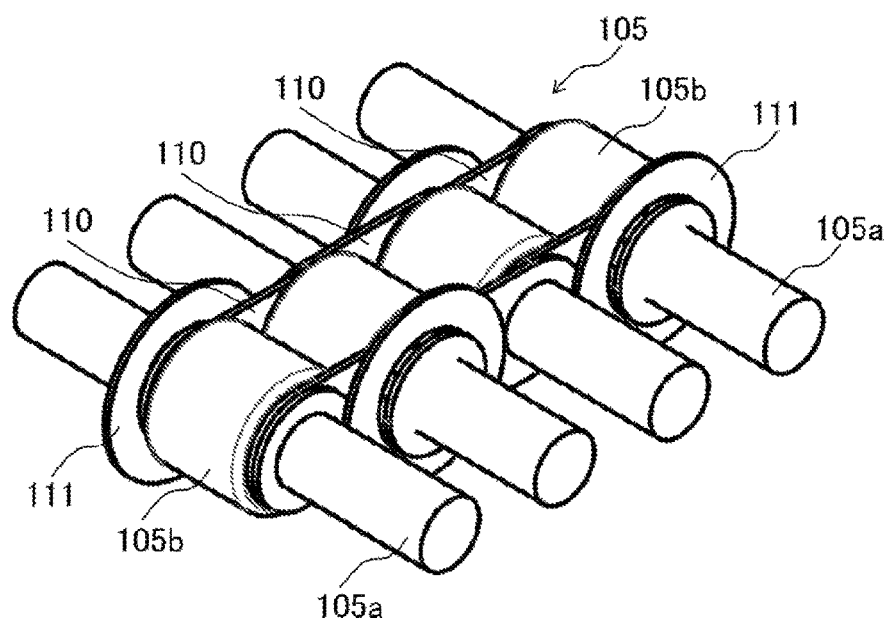
FIG. 5A is a perspective view as one embodiment of pins in the transmission mechanism of the present invention.
Figure 5B:
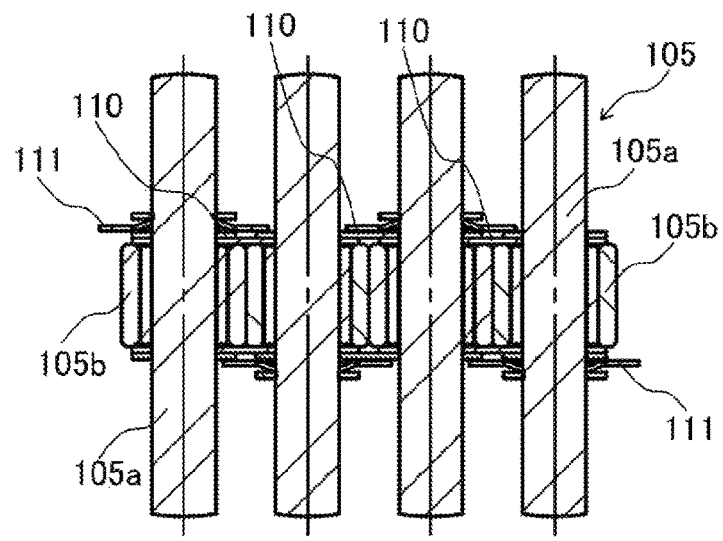
FIG. 5B is a cross-sectional view of the pins of FIG. 5A.
Figure 5C:
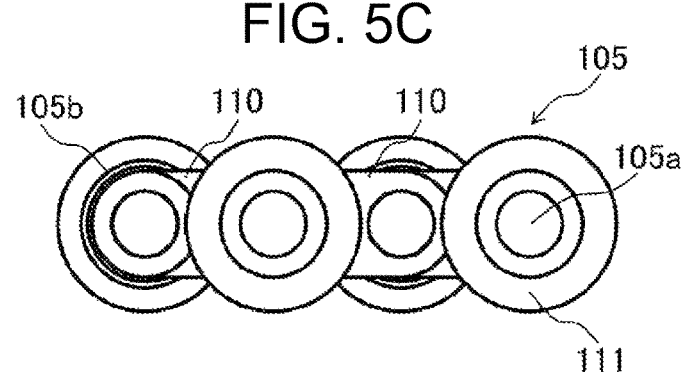
FIG. 5C is a top view of the pins of FIG. 5A.

As shown in FIGS. 5A to 5C, each pin 105 may include an inner shaft portion 105a and an outer ring portion 105b that rotates around the inner shaft portion 105a. The outer ring portion 105b may be in sliding contact and rotate around the inner shaft portion 105a, or may be in rolling contact via a roller or the like and rotate around the inner shaft portion 105a. Each pin 105 is arranged such that the outer ring portion 105b comes into contact with the side surface 103 of the cam 102 and the outer ring portion 105b of the adjacent pin 105. When the gear is arranged on one side with respect to the cam 102, one end of the inner shaft portion 105a of each pin 105 can engage with the gear. When the gear is a pair of gears configured from the first gear 106a and the second gear 106b, both ends of the inner shaft portion 105a of each pin 105 can engage with the first gear 106a and the second gear 106b, respectively. When the guide plate is arranged on one side with respect to the cam 102, one end of the inner shaft portion 105a of each pin 105 is accommodated in the corresponding guide hole of the guide plate. When the guide plate is a pair of guide plates configured from the first guide plate 107a and the second guide plate 107b, both ends of the inner shaft portion 105a of each pin 105 are accommodated in the corresponding first guide hole 109a of the first guide plate 107a and the corresponding second guide hole 109b of the second guide plate 107b, respectively. The two adjacent pins 105 may be coupled so as to sandwich each outer ring portion 105b by two chains 110. Moreover, a pin stopper 111 may be arranged on the inner shaft portion 105a of each pin 105, thereby causing the chain 110 and the outer ring portion 105b not to move in the axial direction of the inner shaft portion 105a.

One of the pair of guide plates configured from the first guide plate 107a and the second guide plate 107b and the pair of gears configured from the first gear 106a and the second gear 106b are fixed to the second shaft, and the other of them are fixed to a housing (not shown) of the transmission mechanism 101. That is to say, either the first guide plate 107a and the second guide plate 107b or the first gear 106a and the second gear 106b rotate together with the second shaft.

As shown in FIGS. 1A to 1F and FIGS. 3A to 3E, the first gear 106a and the second gear 106b configuring the pair of gears may be internal gears. In this case, the cam 102 may have a shape having the side surface 103 of an elliptical column (refer to FIG. 1A), or the side surface 103 of a substantially regular polygonal column such as a substantially regular triangular column (refer to FIG. 3A), a substantially regular square column, a substantially regular pentagonal column, or the like, about the first rotational axis 104, and the plurality of pins 105 are arranged outside along the side surface 103 of the cam 102. For example, when the pair of guide plates configured from the first guide plate 107a and the second guide plate 107b are fixed to the housing of the transmission mechanism 101, as the cam 102 rotates in conjunction with rotation of the first shaft as the input shaft, each pin 105 is guided by the guide holes 109a and 109b in which the pin 105 is accommodated so as to move along the cam 102 and the pair of gears, between the cam 102 and the pair of gears, such that the pair of gears rotate in the direction opposite to the rotational direction of the cam 102. Moreover, when the pair of gears are fixed to the housing of the transmission mechanism 101, as the cam 102 rotates in conjunction with rotation of the first shaft as the input shaft, each pin 105 is guided by the guide holes 109a and 109b in which the pin 105 is accommodated so as to move along the cam 102 and the pair of gears, between the cam 102 and the pair of gears, such that the pair of guide plates rotate in the direction opposite to the rotational direction of the cam 102. The same applies when the second shaft as the input shaft rotates.

As one of the first shaft and the second shaft rotates, the teeth of the first gear 106a and the second gear 106b with which each pin 105 engages are altered, according to the relationship between the side surface 103 of the cam 102 having the local maximal values of the curvature and the first gear 106a and the second gear 106b which are internal gears, whereby the rotation of the one is transmitted to the other of the first shaft and the second shaft so as to rotate the other. As the number of teeth of each of the first gear 106a and the second gear 106b is made $N_T$, the number of the plurality of pins 105 is made $N_P$, and the number of the local maximal values of the curvature is made $N_M$, there is the relationship that $N_T = N_P + N_M$. When the first shaft is made the input shaft, as the pair of guide plates are fixed to the housing of the transmission mechanism 101, the gear ratio is $N_M/N_T$, and as the pair of gears are fixed to the housing of the transmission mechanism 101, the gear ratio is $N_M/N_P$. Moreover, when the second shaft is made the input shaft, as the pair of guide plates are fixed to the housing of the transmission mechanism 101, the gear ratio is $N_T/N_M$, and as the pair of gears are fixed to the housing of the transmission mechanism 101, the gear ratio is $N_P/N_M$.

As shown in FIGS. 2A to 2F and FIGS. 4A to 4E, the first gear 106a and the second gear 106b configuring the pair of gears may be external gears. In this case, a through hole having the side surface 103 of an elliptical column (refer to FIG. 2A), or the side surface 103 of a substantially regular polygonal column such as a substantially regular triangular column (refer to FIG. 4A), a substantially regular square column, a substantially regular pentagonal column, or the like, about the first rotational axis 104 may be provided in the cam 102, and the plurality of pins 105 are arranged inside along the side surface 103 of the cam 102. For example, when the pair of guide plates configured from the first guide plate 107a and the second guide plate 107b are fixed to the housing of the transmission mechanism 101, as the cam 102 rotates in conjunction with rotation of the first shaft as the input shaft, each pin 105 is guided by the guide holes 109a and 109b in which the pin 105 is accommodated so as to move along the cam 102 and the pair of gears, between the cam 102 and the pair of gears, such that the pair of gears rotate in the direction opposite to the rotational direction of the cam 102. Moreover, when the pair of gears are fixed to the housing of the transmission mechanism 101, as the cam 102 rotates in conjunction with rotation of the first shaft as the input shaft, each pin 105 is guided by the guide holes 109a and 109b in which the pin 105 is accommodated so as to move along the cam 102 and the pair of gears, between the cam 102 and the pair of gears, such that the pair of guide plates rotate in the direction opposite to the rotational direction of the cam 102. The same applies when the second shaft as the input shaft rotates.

As one of the first shaft and the second shaft rotates, the teeth of the first gear 106a and the second gear 106b with which each pin 105 engages are altered, according to the relationship between the side surface 103 of the cam 102 having the local maximal values of the curvature and the first gear 106a and the second gear 106b which are external gears, whereby the rotation of the one is transmitted to the other of the first shaft and the second shaft so as to rotate the other. As the number of the plurality of pins 105 is made $N_P$, the number of teeth of each of the first gear 106a and the second gear 106b is made $N_T$, and the number of the local maximal values of the curvature is made $N_M$, there is the relationship that $N_P=N_T+N_M$. When the first shaft is made the input shaft, as the pair of guide plates are fixed to the housing of the transmission mechanism 101, the gear ratio is $N_M/N_T$, and as the pair of gears are fixed to the housing of the transmission mechanism 101, the gear ratio is $N_M/N_P$. Moreover, when the second shaft is made the input shaft, as the pair of guide plates are fixed to the housing of the transmission mechanism 101, the gear ratio is $N_T/N_M$, and as the pair of gears are fixed to the housing of the transmission mechanism 101, the gear ratio is $N_P/N_M$.

It should be further understood by persons skilled in the art that although the foregoing description has been made on embodiments of the present invention, the present invention is not limited thereto and various changes and modifications may be made without departing from the principle of the present invention and the scope of the appended claims.

The invention claimed is:

1. A transmission mechanism comprising:
    a first shaft rotatable about a first rotational axis, the first shaft comprising a cam concentric with the first shaft and fixed to the first shaft, the side surface of the cam having a positive curvature when viewed from the first rotational axis;
    a plurality of pins arranged along the side surface of the cam;
    a second shaft rotatable about a second rotational axis;
    a guide plate concentric with the second shaft, a plurality of guide holes being provided in the guide plate along a rotational direction of the second shaft, each pin being accommodated in a corresponding guide hole; and
    a gear concentric with the second shaft, the gear being capable of engaging with each pin; wherein
    in conjunction with rotation of one of the first shaft and the second shaft, each pin is guided by the corresponding guide hole so as to move along the cam and the gear, thereby causing the other of the first shaft and the second shaft to rotate relative to the one of the first shaft and the second shaft; and
    the plurality of pins are divided into a plurality of groups, and whereas the pins in one group are coupled in series by a chain, the pins in the one group are not coupled to the pins in another group by the chain.

2. The transmission mechanism according to claim 1, wherein the curvature of the side surface of the cam obtained by circling along a rotational direction of the first shaft has two local maximal values or more, and the plurality of pins are divided into the plurality of groups based on the number of the local maximal values.

3. The transmission mechanism according to claim 2, wherein the number of the plurality of groups is an integral multiple greater than or equal to 2 of the number of the local maximal values.

4. The transmission mechanism according to claim 2, wherein the gear is an internal gear, and the plurality of pins are arranged outside the cam.

5. The transmission mechanism according to claim 4, wherein the number of teeth of the gear is the sum of the number of the plurality of pins and the number of the local maximal values.

6. The transmission mechanism according to claim 2, wherein the gear is an external gear, and the plurality of pins are arranged inside the cam.

7. The transmission mechanism according to claim 6, wherein the number of the plurality of pins is the sum of the number of teeth of the gear and the number of the local maximal values.

8. The transmission mechanism according to claim 1, wherein the number of the plurality of groups is an integer greater than or equal to 2.

9. The transmission mechanism according to claim 1, wherein the pins in the one group are coupled in series such that two adjacent pins are coupled by the chain.

10. The transmission mechanism according to claim 1, wherein either one of the guide plate and the gear is fixed to the second shaft.

* * * * *